United States Patent
Tomioka

(10) Patent No.: US 7,177,100 B2
(45) Date of Patent: Feb. 13, 2007

(54) THREE LENS GROUP ZOOM LENS

(75) Inventor: Ryoko Tomioka, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/316,979

(22) Filed: Dec. 27, 2005

(65) Prior Publication Data

US 2006/0193060 A1    Aug. 31, 2006

(30) Foreign Application Priority Data

Dec. 28, 2004  (JP)  ............ P.2004-380436

(51) Int. Cl.
*G02B 9/12*  (2006.01)
*G02B 15/14* (2006.01)

(52) U.S. Cl. .................... 359/784; 359/689
(58) Field of Classification Search ............. 359/784, 359/676, 677, 683, 989, 781–783, 770, 761
See application file for complete search history.

(56) References Cited

U.S. PATENT DOCUMENTS

2005/0024749 A1*  2/2005  Nanba et al. ............ 359/784

FOREIGN PATENT DOCUMENTS

| JP | 2003-107348 A | 4/2003 |
|----|---------------|--------|
| JP | 2003-140041 A | 5/2003 |

* cited by examiner

*Primary Examiner*—Loha Ben
*Assistant Examiner*—Jack Dinh
(74) *Attorney, Agent, or Firm*—Birch, Stewart, Kolasch & Birch, LLP

(57) ABSTRACT

A three lens group zoom lens is provided and includes three lens groups of negative, positive, and positive in this order from an object side and varies a magnification by changing distances among respective lens groups. A first group includes, in order from the object side, a negative lens in a meniscus shape directing a convex surface on the object side, a negative lens in a meniscus shape directing a convex surface on the object side, and a positive lens in a meniscus shape directing a convex surface on the object side. A second group includes, in order from the object side, a cemented lens including a bi-convex lens and a bi-concave lens, and a lens in a meniscus shape directing a concave surface on the object side. A third group includes a positive lens. Each of the first group and the second group includes an aspherical surface.

3 Claims, 4 Drawing Sheets

WIDE ANGLE END

MIDDLE POSITION

TELEPHOTO END

THREE LENS GROUP ZOOM LENS

FIELD OF THE INVENTION

The present invention relates to a small-sized three lens group zoom lens having a zoom ratio of about three times and a wide field angle.

BACKGROUND OF THE INVENTION

In the related art, there is widely used a three lens group zoom lens as zoom lenses of various cameras, which is capable of reducing size and excellently correcting aberrations.

Meanwhile, according to a digital camera or a video camera spreading rapidly in recent years, small-sized formation, high image quality and low distortion of lenses have been desired similarly to those used in general cameras.

Further, according to a digital camera or a video camera, automatic focusing is mainly adopted and high speed formation of focusing has been desired. Therefore, there is frequently used a focusing system of zoom lens of an inner focusing type or a rear focusing type capable of lightening a lens weight, placing lenses proximate to a camera main body side and facilitating driving operation. In such zoom lenses, from a view point of achieving small-sized formation, high image quality and low distortion of lenses, it is preferable to constitute lenses by three groups rather than constituting lenses by two groups.

There are known such three group zoom lenses adopting a rear focusing system, achieving high speed formation of focusing and small-sized formation (refer to, for example. JP-A-2003-140041), achieving wide field angle formation (refer to, for example, JP-A-2003-107348).

However, in recent years, there is also increased request for zoom lenses having wider field angle in addition to small-sized formation and high function formation of an optical system.

In this respect, according to the zoom lenses described in JP-A-2003-140041, a first lens group is constituted by two lenses in order to achieve small-sized formation and therefore, a field angle at a wide angle end becomes about 65 degrees, and wide angle formation is not achieved sufficiently.

Further, although according to zoom lenses described in JP-A-2003-107348, a field angle at a wide angle end is as wide as about 77 degrees, however, since a second lens group is constituted by five lenses, small-sized formation is not achieved sufficiently.

SUMMARY OF THE INVENTION

An object of an illustrative, non-limiting embodiment of the invention is to solve the above-described problems and to provide a three lens group zoom lens having a zoom ratio of about three times, a wide field angle and a high image quality and capable of excellently correcting various aberrations despite that a total length of an optical system retracted in a camera body is small and compact. Also, the invention is not required to solve the above-described problems, and an illustrative, non-limiting embodiment of the invention may solve a different problem or may not solve any problems.

An illustrative, non-limiting embodiment of the three lens group zoom lens of the invention is characterized in that the zoom lens comprising: a first lens group having a negative refractive power; a second lens group having a positive refractive power; and a third lens group having a positive refractive power in this order from an object side, the zoom lens varying a magnification thereof by changing distances among the first, second and third lens groups, wherein the first lens group comprises: a first lens that has a negative refractive power and has a meniscus shape directing a convex surface on the object side; a second lens that has a negative refractive power and has a meniscus shape directing a convex surface on the object side; and a third lens that has a positive refractive power and has a meniscus shape directing a convex surface on the object side, wherein the first, second and third lenses are arranged in this order from the object side, wherein the second lens group comprises: a fourth lens having a bi-convex shape; a fifth lens having a biconcave shape; and a sixth lens having a meniscus shape directing a concave surface on the object side, wherein the fourth, fifth and sixth lenses are arranged in this order from the object side, and the fourth and fifth lenses comprises a cemented lens in which lens surfaces of the fourth and fifth lenses are cemented with each other, and wherein the third lens group consists of a positive lens, and each of the first and second lens groups has at least one aspherical surface.

Further, in the zoom lens, it is preferable to satisfy the following condition (1):

$$0.8 < |f_{G1}/f_{G2}| < 1.1 \tag{1}$$

wherein $f_{G1}$ represents a focal length of the first lens group, and
$f_{G2}$ represents a focal length of the second lens group.

Further, in the zoom lens, it is preferable to satisfy the following conditions (2) to (6):

$$N_{d1,2} > 1.8 \tag{2}$$

$$N_{d3} > 1.85 \tag{3}$$

$$v_{d1,2} > 40 \tag{4}$$

$$v_{d3} < 21 \tag{5}$$

$$4 < f_3/f_w < 5 \tag{6}$$

wherein $N_{d1,2}$ represents an average value of refractive indices of the first lens and the second lens at the d line,
$v_{d1,2}$ represents an average value of Abbe numbers of the first lens and the second lens $L_2$ at the d line,
$N_{d3}$ represents a refractive index of the third lens at the d line,
$v_{d3}$ represents Abbe number of the third lens at the d line,
$f_3$ represents a focal length of the third lens, and
$f_w$ represents a focal length of the zoom lens at a wide angle end.

By including the above-described lens constitution, the three lens group zoom lens of the invention has a zoom ratio of about three times despite the constitution of a small number of lenses, which is the 7 lenses constitution, and has a wide angle and a high image quality and is capable of excellently correcting various aberrations despite that a total length of an optical system retracted in a camera body is small and compact.

Particularly, by arranging the cemented lens (the fourth and fifth lenses) in the second lens group, the cemented lens can contribute to thinning a thickness of the second lens group and shortening the lens total length in retracting the lens into the camera body. Further, by constituting the single lens (the sixth lens) in the second lens group by a meniscus lens directing the concave surface on the object side, an excellent telescentric property can be achieved.

Further, by satisfying the above-described respective conditions, while maintaining a zoom ratio of about three times, the various aberrations can be corrected with an excellent balance.

DETAILED DESCRIPTION OF THE INVENTION

Figure 1:
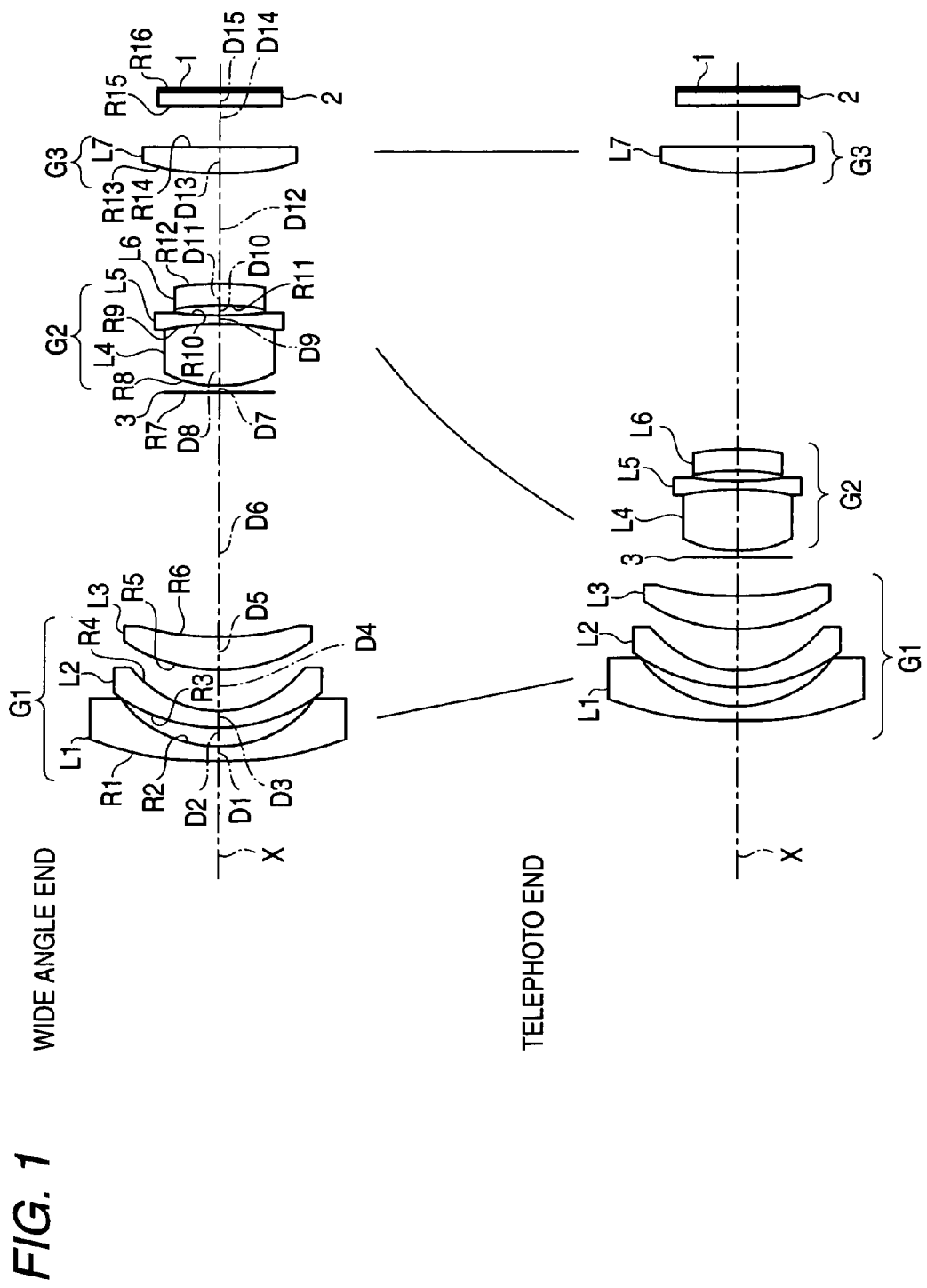
FIG. 1 is a cross-sectional view of a three lens group zoom lens according to an exemplary embodiment 1 of the invention.

An explanation will be given of an exemplary embodiment of a three lens group zoom lens according to the invention based on specific embodiments shown in the drawings.

Figure 2:
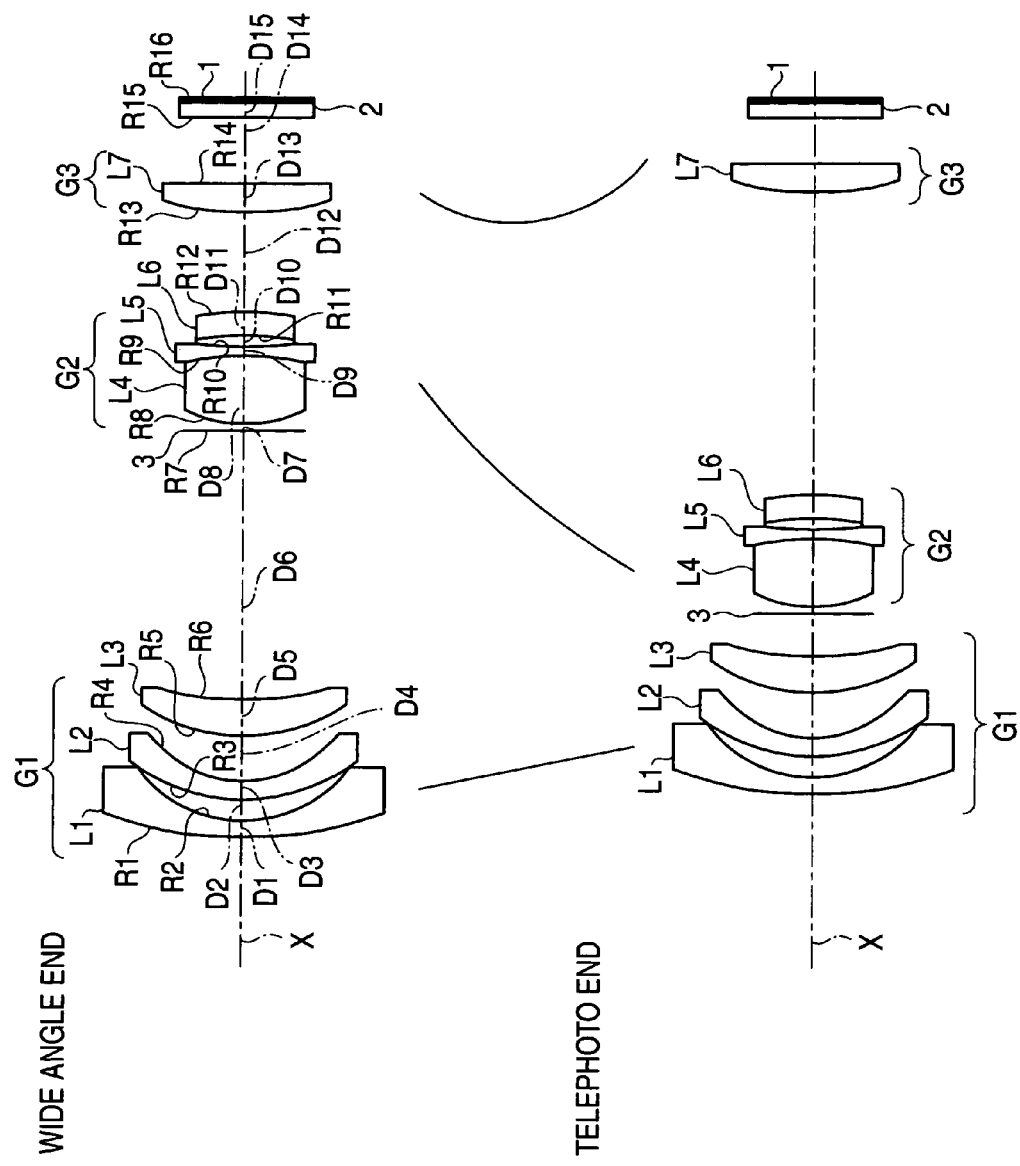
FIG. 2 is a cross-sectional view of a three lens group zoom lens according to an exemplary embodiment 2 of the invention.

FIG. 1 is a cross-sectional view of a three lens group zoom lens according to an exemplary embodiment 1, and FIG. 2 is a cross-sectional view of a three lens group zoom lens according to an exemplary embodiment 2. Further, in FIGS. 1 and 2, upper stages thereof show lens constitutions at a wide angle end, lower stages thereof show lens constitutions at a telephoto end, and movements of respective lens groups in varying a magnification (or power) are shown between the upper stages and the lower stages.

As shown by FIGS. 1 and 2, three lens group zoom lenses according to the embodiments 1 and 2 of the invention each includes a first lens group $G_1$ having a negative refractive power, a diaphragm 3 for adjusting light amounts, a second lens group $G_2$ having a positive refractive power, a third lens group $G_3$ having a positive refractive power, and a filter portion 2 including infrared ray filters or the like, in this order from the object side.

According to the three lens group zoom lenses, in varying the magnification thereof from the wide angle end to the telephoto end, the first lens group $G_1$ is moved to be relatively proximate to the second lens group $G_2$, and moved to increase a distance between the second lens group $G_2$ and the third lens group $G_3$, in focusing from infinity to a short distance, the third lens group $G_3$ is moved to the object side. According to the three lens group zoom lenses including such a constitution, a light flux incident from the object side along an optical axis X is focused at a focal position on a imaging face 1.

By constructing such a constitution of the lens groups, the distance between the second lens group $G_2$ and the third lens groups $G_3$ can be contracted in retracting the lens into a camera body, and also the lens total length in the retracting can be shortened.

Further, the first lens group $G_1$ includes arranged in order from the object side: a first lens $L_1$ having a negative refractive power and having a meniscus shape directing a convex surface on the object side; a second lens $L_2$ having a negative refractive power and having a meniscus shape directing a convex surface on the object side; and a third lens $L_3$ having a positive refractive power and having a meniscus shape directing a convex surface on the object side.

Further, the second lens group $G_2$ includes: arranged in order from the object side a fourth lens $L_4$ having a bi-convex shape, a fifth lens $L_5$ having a bi-concave shape, and a sixth lens $L_6$ having a meniscus shape directing a concave surface on the object side, and the fourth lens $L_4$ and the fifth lens $L_5$ are made to constitute a cemented lens in which lens surfaces thereof are cemented with each other.

Further, the third lens group $G_3$ includes a positive lens (seventh lens $L_7$).

Further, each of the first lens group G1 and the second lens group G2 has an aspherical surface.

By constituting the respective lens groups by such a lens constitution, a wide angle formation can be achieved and various aberrations can excellently be corrected despite the seven lenses constitution. Particularly, by making the fourth lens $L_4$ and the fifth lens $L_5$ constituting the second lens group $G_2$ to constitute the cemented lens in which lens surfaces thereof are cemented with each other, the lens total length in retracting the lens into a camera body can be shortened by thinning a thickness of the second lens group $G_2$. Further, by constituting the sixth lens $L_6$ of the second lens group $G_2$ by a meniscus lens directing the concave surface on the object side, an excellent telescentric performance can be achieved.

Further, the three lens group zoom lenses according to the embodiments 1 and 2 of the invention satisfy the following conditions (1) to (6):

$$0.8 < |f_{G1}/f_{G2}| < 1.1 \tag{1}$$

$$N_{d1,2} > 1.8 \tag{2}$$

$$N_{d3} > 1.85 \tag{3}$$

$$v_{d1,2} > 40 \tag{4}$$

$$v_{d3} < 21 \tag{5}$$

$$4 < f_3/f_w < 5 \tag{6}$$

wherein $N_{d1,2}$ represents an average value of refractive indices of the first lens $L_1$ and the second lens $L_2$ at the d line, $v_{d1,2}$ represents an average value of Abbe numbers of the first lens $L_1$ and the second lens $L_2$ at the d line, $N_{d3}$ represents a refractive index of the third lens $L_3$ at the d line, $v_{d3}$ represents Abbe number of the third lens $L_3$ at the d line, $f_3$ represents a focal length of the third lens $L_3$, $f_w$ represents a focal length of the zoom lens at a wide angle end $f_{G1}$ represents a focal length of the first lens group $G_1$, and $f_{G2}$ represents a focal length of the second lens group $G_2$.

The condition (1) is a condition with regard to a ratio of focal lengths of the first lens group $G_1$ and the second lens group $G_2$, and by satisfying the condition (1), while maintaining the zoom ratio of about three times, various aberrations can be corrected with excellent balance.

The conditions (2) to (5) are conditions with regard to refractive indices of respective lenses constituting the first lens group $G_1$, and by satisfying the conditions, the lateral color can excellently be corrected.

The condition (6) is a condition with regard to refractive power of the positive lens (third lens $L_3$) having the meniscus shape and included in the first lens group $G_1$, and in the condition, when a value of $f_3/f_w$ exceeds an upper limit, it is difficult to correct a distortion aberration and when the value of $f_3/f_w$ exceeds a lower limit, it is difficult to correct a field curvature at the wide angle end.

Embodiment 1

Specific data will be shown with regard to the three lens group zoom lens of the embodiment 1 as follows.

An upper stage of Table 1, shown below, shows radii of curvature R (mm) of respective lens surfaces or the like, on-axis surface distances D (mm) of respective lenses or the like (center thicknesses of respective lenses and air distances between respective lenses; the same as those in Table 4, shown below), refractive indices $N_d$ and Abbe numbers $\nu_d$ of respective lenses at the d line. Further, in Table 1 (and Table 4) shown below, numbers in correspondence with respective notations are increased in order from the object side with regard to the three lens group zoom lens of the embodiment 1 (and of the embodiment 2).

Further, a lower stage of Table 1, shown below, shows values of focal lengths f (mm), FNOs., field angles (degree) of the total system (the zoom lens) at a wide angle end and a telephoto end with regard to the three lens group zoom lens of the embodiment 1.

Further, a surface attached with * on a left side of FNO. in Table 1, shown below, indicates that the surface is an aspherical surface, and each aspherical surface is indicated by an aspherical surface equation, shown below.

Aspherical surface depth:

$$Z = \frac{Y^2/R^2}{1 + (1 - KA \cdot Y^2/R^2)^{1/2}} + \sum_{i=3}^{16} A_i Y^i$$

wherein
Z represents an aspherical surface depth,
Y represents a height,
R represents a paraxial radius of curvature, and
KA represents a eccentricity.

TABLE 1

Embodiment 1

| No. | radius of curvature | surface distance | Nd | νd |
|---|---|---|---|---|
| 1 | 29.8007 | 1.20 | 1.83481 | 42.7 |
| 2 | 9.4007 | 1.58 | | |
| *3 | 11.9779 | 1.40 | 1.80348 | 40.4 |
| *4 | 6.7161 | 3.45 | | |
| 5 | 12.3819 | 2.80 | 1.92286 | 18.9 |
| 6 | 20.6923 | Changing: d1 | | |
| 7(diaphragm) | ∞ | 0.50 | | |
| 8 | 8.3428 | 5.09 | 1.80400 | 46.6 |
| 9 | −21.6059 | 0.67 | 1.92286 | 20.9 |
| 10 | 21.6059 | 0.88 | | |
| *11 | −20.1687 | 1.80 | 1.51760 | 63.5 |
| *12 | −13.1162 | Changing: d2 | | |
| 13 | 19.2776 | 2.22 | 1.48749 | 70.4 |
| 14 | ∞ | 1.50 | | |
| 15 | ∞ | 1.11 | 1.51680 | 64.2 |
| 16 | ∞ | | | | f = 6.40 to 18.29 mm, FNO. = 2.9 to 4.8, field angle 2ω = 77.2 to 29.8 degrees

Table 2, shown below, shows value of an on axis surface distance d1 (mm) between the first lens group $G_1$ and the diaphragm 3 and an on-axis surface distance d2 (mm) between the second lens group $G_2$ and the third lens group $G_3$ at a wide angle end, a middle position and a telephoto end.

TABLE 2

| | focal length (mm) | d1 | d2 |
|---|---|---|---|
| wide angle end | 6.40 | 20.72 | 9.19 |
| middle position | 9.72 | 11.51 | 13.21 |
| telephoto end | 18.29 | 3.20 | 23.55 |

Table 3, shown below, shows values of eccentricities KA, and respective aspherical surface coefficients $A_3$, $A_4$, $A_5$, $A_6$, $A_7$, $A_8$, $A_9$, $A_{10}$, $A_{11}$, $A_{12}$, $A_{13}$ and $A_{14}$ of 3-th, 4-th, 5-th, 6-th, 7-th, 8-th, 9-th, 10-th, 11-th, 12-th, 13-th and 14-th with regard to the above-described aspherical surfaces (however, values up to 10-th in the 11-th and 12-th surfaces).

TABLE 3

Aspherical surface coefficient

| No. | KA | A3 | A4 | A5 | A6 |
|---|---|---|---|---|---|
| 3 | 0.018857 | $1.4628156 \times 10^{-4}$ | $1.1725652 \times 10^{-6}$ | $-2.7510086 \times 10^{-6}$ | $2.0584142 \times 10^{-8}$ |
| 4 | 0.343295 | $-1.1290997 \times 10^{-5}$ | $-1.4159479 \times 10^{-5}$ | $-3.0730927 \times 10^{-5}$ | $1.5023020 \times 10^{-6}$ |

| | A7 | A8 | A9 | A10 |
|---|---|---|---|---|
| 3 | $6.1709821 \times 10^{-8}$ | $6.9912408 \times 10^{-10}$ | $-7.6308044 \times 10^{-11}$ | $-2.7846759 \times 10^{-12}$ |
| 4 | $2.1704052 \times 10^{-8}$ | $-1.5480137 \times 10^{-9}$ | $-1.2388226 \times 10^{-9}$ | $-2.8084509 \times 10^{-11}$ |

| | A11 | A12 | A13 | A14 |
|---|---|---|---|---|
| 3 | $3.0334734 \times 10^{-14}$ | $-5.7004328 \times 10^{-15}$ | $1.1884068 \times 10^{-14}$ | $6.8366280 \times 10^{-16}$ |
| 4 | $-2.1235912 \times 10^{-12}$ | $-4.9691181 \times 10^{-14}$ | $-7.2728043 \times 10^{-14}$ | $-1.1028746 \times 10^{-15}$ |

| No. | KA | A3 | A4 | A5 | A6 |
|---|---|---|---|---|---|
| 11 | 0.203591 | $1.7251536 \times 10^{-4}$ | $-5.3607945 \times 10^{-4}$ | $6.9405163 \times 10^{-5}$ | $7.8276760 \times 10^{-6}$ |
| 12 | 1.219653 | $2.6545502 \times 10^{-4}$ | $4.2031185 \times 10^{-4}$ | $-2.4978599 \times 10^{-5}$ | $3.5870891 \times 10^{-5}$ |

TABLE 3-continued

| | Aspherical surface coefficient | | | |
|---|---|---|---|---|
| | A7 | A8 | A9 | A10 |
| 11 | $7.9178787 \times 10^{-6}$ | $4.0549150 \times 10^{-8}$ | $-1.5915411 \times 10^{-7}$ | $-4.0031367 \times 10^{-9}$ |
| 12 | $9.5800549 \times 10^{-6}$ | $1.2334451 \times 10^{-9}$ | $-2.3555291 \times 10^{-7}$ | $-7.2762668 \times 10^{-9}$ |

Table 7, shown below, shows respective values of the above-described conditions (1) to (6) with regard to the three lens group zoom lens of the embodiment 1.

As is apparent from Table 7, shown below, the three lens group zoom lenses of the embodiment 1 satisfy all of the above-described conditions (1) to (6).

Figure 3:
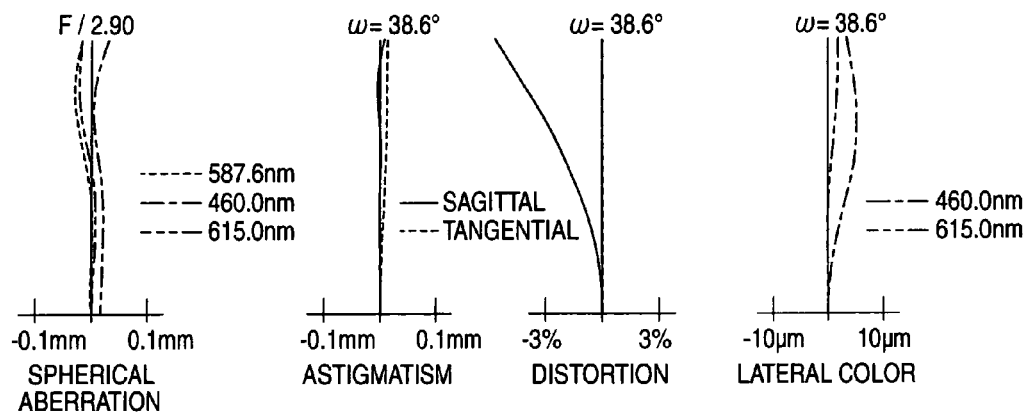
FIG. 3 illustrates aberration diagrams of various aberrations (spherical aberration, astigmatism, distortion, lateral color) with regard to the three lens group zoom lens according to the embodiment 1 of the invention.
Figure 3:
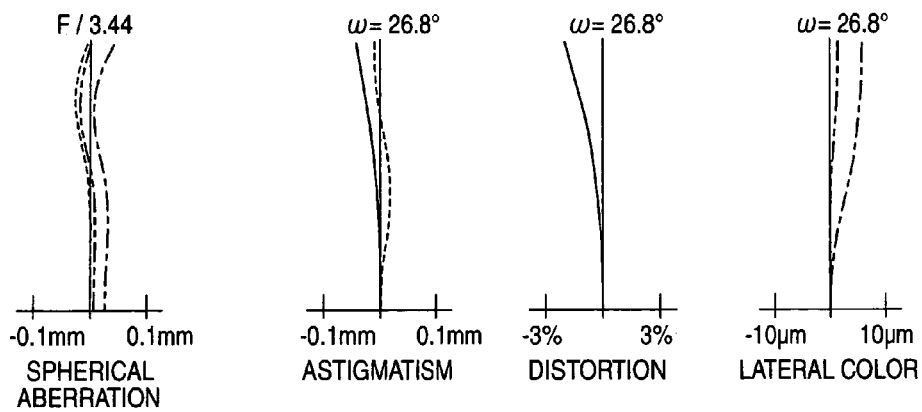
Figure 3:
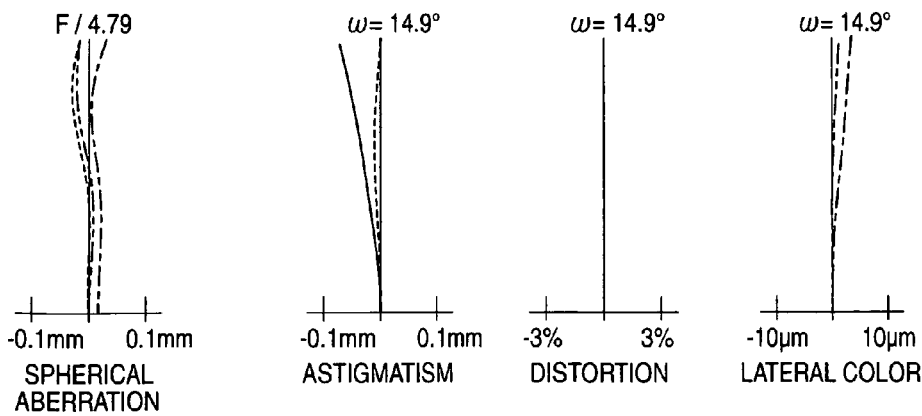

FIG. 3 illustrates aberration diagrams showing various aberrations (spherical aberration, astigmatism, distortion, lateral color) with regard to the three lens group zoom lens of the embodiment 1. Further, in the aberration diagrams, respective aberration curves of the spherical aberrations show aberrations at 587.6 nm, 460.0 nm, and 615.0 nm, respective aberration curves of astigmatisms show aberrations at sagittal image surfaces and tangential image surfaces, respective aberration curves of the lateral colors show aberrations at 460.0 nm and 615.0 nm (the same in FIG. 4).

As is apparent from FIG. 3, the three lens group zoom lens of the embodiment 1 is made to be a three lens group zoom lens of the embodiment 1 capable of excellently correcting the respective aberrations.

Embodiment 2

Specific data will be shown with regard to the three lens group zoom lens of the embodiment 2 as follows.

Further, the three lens group zoom lens of the embodiment 2 are constructed by a constitution of also moving the third lens group $G_3$ in varying the magnification different from the three lens group zoom lens of the embodiment 1.

An upper stage of Table 4, shown below, shows radii of curvature R (mm) of respective lens surfaces or the like, on axis surface distances D (mm) of respective lenses or the like, refractive indices $N_d$ at d lines and Abbe numbers $v_d$.

Further, a lower stage of Table 4, shown below, shows values of focal lengths f (mm), FNOs., field angles 2 ω (degree) of a total system at a wide angle end and a telephoto end.

Further, in Table 4, shown below, a surface attached with * on a left side of FNO. indicates that the surface is an aspherical surface and respective aspherical surfaces are indicated by the aspherical surface equation, shown above.

TABLE 4

Embodiment 2

| No. | radius of curvature | surface distance | Nd | vd |
|---|---|---|---|---|
| 1 | 29.5268 | 1.50 | 1.83481 | 42.7 |
| 2 | 9.2908 | 1.68 | | |
| *3 | 12.5839 | 1.45 | 1.80348 | 40.4 |
| *4 | 6.8771 | 3.46 | | |
| 5 | 12.4339 | 3.30 | 1.92286 | 18.9 |
| 6 | 21.0432 | Changing: d1 | | |
| 7(diaphragm) | ∞ | 0.50 | | |
| 8 | 8.8351 | 4.94 | 1.80400 | 46.6 |
| 9 | −22.8099 | 0.67 | 1.92286 | 20.9 |
| 10 | 22.8099 | 1.00 | | |
| *11 | −13.8699 | 2.10 | 1.51760 | 63.5 |
| *12 | −9.54052 | Changing: d2 | | |
| 13 | 21.1457 | 2.19 | 1.48749 | 70.4 |
| 14 | −469.0530 | Changing: d3 | | |
| 15 | ∞ | 1.11 | 1.51680 | 64.2 |
| 16 | ∞ | | | | f = 6.40 to 18.29 mm, FNO. = 2.9 to 5.0, field angle 2 ω = 77.0 to 29.8 degrees

Table 5, shown below, shows values of an on-axis surface distance d1 (mm) between the first lens group $G_1$ and the diaphragm 3 and an on-axis surface distance d2 (mm) between the second lens group $G_2$ and the third lens group $G_3$, and an on-axis surface distance d3 (mm) between the third lens $G_3$ and the filter portion 2 at a wide angle end, a middle position and a telephoto end.

TABLE 5

| | focal length (mm) | d1 | d2 | d3 |
|---|---|---|---|---|
| wide angle end | 6.40 | 19.56 | 7.37 | 3.97 |
| middle position | 9.72 | 10.09 | 10.65 | 4.95 |
| telephoto end | 18.29 | 3.20 | 25.23 | 1.50 |

Table 6, shown below, shows values of eccentricities KA with regard to the aspherical surfaces and respective aspherical surface coefficients $A_3$, $A_4$, $A_5$, $A_6$, $A_7$, $A_8$, $A_9$, $A_{10}$, $A_{11}$, $A_{12}$, $A_{13}$, $A_{14}$ $A_{15}$, $A_{16}$ of 3-th, 4-th, 5-th, 6-th, 7-th, 8-th, 9-th, 10-th, 11-th, 12-th, 13-th, 14-th, 15-th, 16-th with regard to the above-described aspherical surfaces (however, values up to 10-th in the 11-th and 12-th surfaces).

TABLE 6

| | | Aspherical surface coefficient | | | |
|---|---|---|---|---|---|
| No. | KA | A3 | A4 | A5 | A6 |
| 3 | 0.1339322 | $-6.9523667 \times 10^{-6}$ | $3.1585577 \times 10^{-5}$ | $1.60755606 \times 10^{-6}$ | $-2.9698102 \times 10^{-7}$ |
| 4 | 0.2680712 | $-1.4097588 \times 10^{-4}$ | $6.8988909 \times 10^{-5}$ | $-2.2813278 \times 10^{-5}$ | $1.4461845 \times 10^{-6}$ |

TABLE 6-continued

| | Aspherical surface coefficient | | | | |
|---|---|---|---|---|---|
| | A7 | A8 | A9 | A10 | A11 |
| 3 | $4.3914816 \times 10^{-8}$ | $6.4334222 \times 10^{-10}$ | $-2.7405864 \times 10^{-11}$ | $-3.1412951 \times 10^{-14}$ | $1.4716479 \times 10^{-13}$ |
| 4 | $2.8702253 \times 10^{-9}$ | $-1.9739497 \times 10^{-9}$ | $-1.4265844 \times 10^{-9}$ | $-2.9893567 \times 10^{-11}$ | $-2.1338395 \times 10^{-12}$ |
| | A12 | A13 | A14 | A15 | A16 |
| 3 | $7.4868518 \times 10^{-15}$ | $2.0861276 \times 10^{-14}$ | $1.0080857 \times 10^{-15}$ | $-1.4762122 \times 10^{-17}$ | $1.6438321 \times 10^{-19}$ |
| 4 | $-4.1157696 \times 10^{-14}$ | $-7.2703527 \times 10^{-14}$ | $-7.7127750 \times 10^{-16}$ | $-3.7732750 \times 10^{-18}$ | $8.1256719 \times 10^{-19}$ |
| No. | KA | A3 | A4 | A5 | A6 |
| 11 | 0.5464765 | $1.3816145 \times 10^{-4}$ | $-6.8666164 \times 10^{-4}$ | $3.1258337 \times 10^{-5}$ | $8.2172324 \times 10^{-6}$ |
| 12 | 1.5573423 | $9.5976726 \times 10^{-5}$ | $3.9916535 \times 10^{-4}$ | $-1.0681592 \times 10^{-4}$ | $3.5139857 \times 10^{-5}$ |
| | | A7 | A8 | A9 | A10 |
| 11 | | $8.4793344 \times 10^{-6}$ | $4.8140040 \times 10^{-8}$ | $-1.3067032 \times 10^{-7}$ | $-3.4126437 \times 10^{-9}$ |
| 12 | | $9.2888599 \times 10^{-6}$ | $4.4093743 \times 10^{-9}$ | $-2.2195194 \times 10^{-7}$ | $-6.8584761 \times 10^{-9}$ |

Table 7, shown below, shows respective values of the above-described conditions (1) to (6) with regard to the three lens group zoom lens of the embodiment 2.

As is apparent from Table 7, shown below, the three lens group zoom lens of the embodiment 2 satisfy all of the above-described conditions (1) to (6).

TABLE 7

| | Conditions | Embodiment 1 | Embodiment 2 |
|---|---|---|---|
| (1) | $|f_{G1}/f_{G2}|$ | 0.975 | 0.932 |
| (2) | $N_{d1,2}$ | 1.81915 | 1.81915 |
| (3) | $N_{d3}$ | 1.92286 | 1.92286 |
| (4) | $v_{d1,2}$ | 41.55 | 41.55 |
| (5) | $v_{d3}$ | 18.9 | 18.9 |
| (6) | $f_3/f_w$ | 4.437 | 4.29 |

Figure 4:
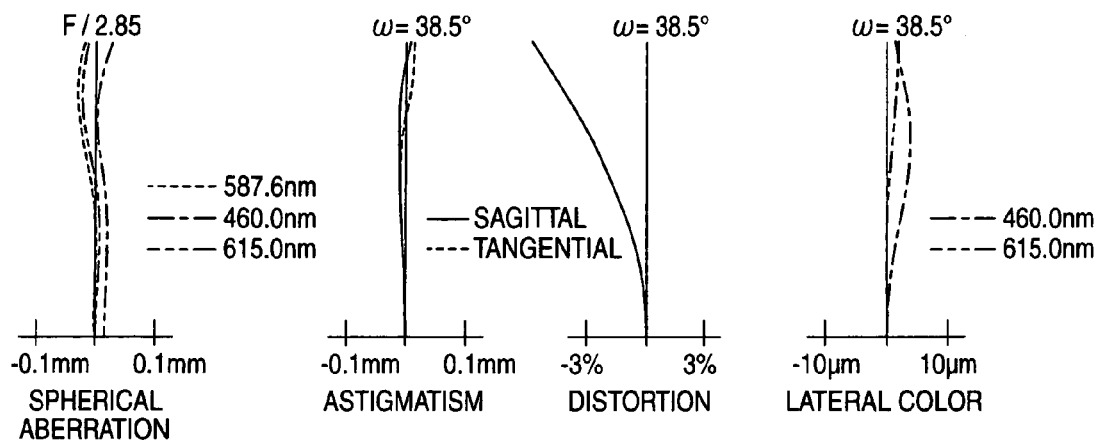
FIG. 4 illustrates aberration diagrams of various aberrations (spherical aberration, astigmatism, distortion, lateral color) with regard to the three lens group zoom lens according to the embodiment 2 of the invention.
Figure 4:
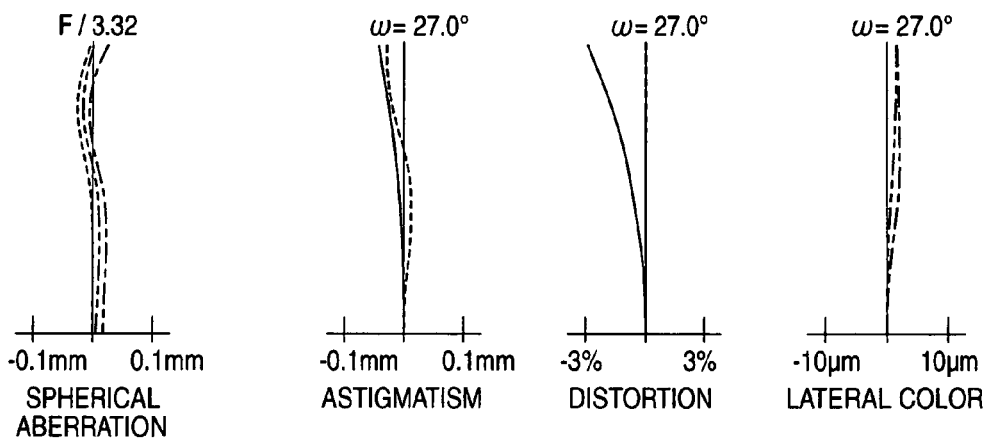
Figure 4:
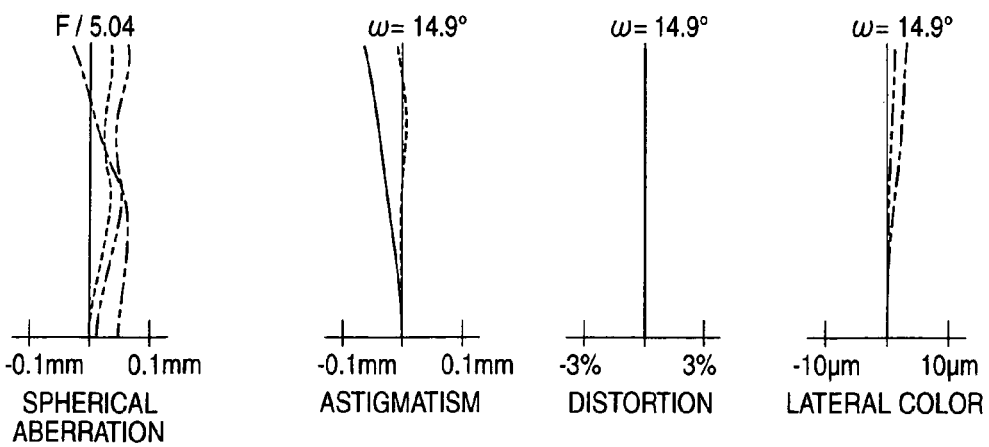

FIG. 4 illustrates aberration diagrams showing various aberrations (spherical aberration, astigmatism, distortion, lateral color) with regard to the three lens group zoom lens of the embodiment 2.

As is apparent from FIG. 4, the three lens group zoom lens of the embodiment 2 is made to be a three lens group zoom lens of the embodiment capable of excellently correcting the respective aberrations.

While the invention has been described in detail and with reference to specific embodiments thereof, it will be apparent to one skilled in the art that various changes and modifications can be made therein without departing from the spirit and scope thereof.

The present application claims foreign priority based on Japanese Patent Application No. JP2004-380436 filed Dec. 28 of 2004, the contents of which is incorporated herein by reference.

What is claimed is:

1. A zoom lens comprising:
a first lens group having a negative refractive power;
a second lens group having a positive refractive power; and
a third lens group having a positive refractive power in this order from an object side, wherein
the zoom lens varies a magnification thereof by changing distances among the first, second and third lens groups,
the first lens group comprises: a first lens that has a negative refractive power and has a meniscus shape directing a convex surface on the object side; a second lens that has a negative refractive power and has a meniscus shape directing a convex surface on the object side; and a third lens that has a positive refractive power and has a meniscus shape directing a convex surface on the object side, wherein the first, second and third lenses are arranged in this order from the object side,
the second lens group comprises: a fourth lens having a bi-convex shape; a fifth lens having a bi-concave shape; and a sixth lens having a meniscus shape directing a concave surface on the object side, wherein the fourth, fifth and sixth lenses are arranged in this order from the object side, and the fourth and fifth lenses comprises a cemented lens in which lens surfaces of the fourth and fifth lenses are cemented with each other,
the third lens group consists of a positive lens, and
each of the first and second lens groups has at least one aspherical surface.

2. The zoom lens according to claim 1, which satisfies a condition (1):

$$0.8 < |f_{G1}/f_{G2}| < 1.1 \quad (1)$$

wherein
$f_{G1}$ represents a focal length of the first lens group, and
$f_{G2}$ represents a focal length of the second lens group.

3. The zoom lens according to claim 1, which satisfies conditions (2) to (6):

$$N_{d1,2} > 1.8 \quad (2)$$

$$N_{d3} > 1.85 \quad (3)$$

$$v_{d1,2} > 40 \quad (4)$$

$$v_{d3} < 21 \quad (5)$$

$$4 < f_3/f_w < 5 \quad (6)$$

wherein
$N_{d1,2}$ represents an average value of refractive indices of the first lens and the second lens at the d line.

$v_{d1,2}$ represents an average value of Abbe numbers of the first lens and the second lens at the d line, $N_{d3}$ represents a refractive index of the third lens at the d line, $v_{d3}$ represents Abbe number of the third lens at the d line, $f_3$ represents a focal length of the third lens, and $f_w$ represents a focal length of the zoom lens at a wide angle end.

* * * * *

UNITED STATES PATENT AND TRADEMARK OFFICE
CERTIFICATE OF CORRECTION

PATENT NO. : 7,177,100 B2 Page 1 of 1
APPLICATION NO. : 11/316979
DATED : February 13, 2007
INVENTOR(S) : Ryoko Tomioka It is certified that error appears in the above-identified patent and that said Letters Patent is hereby corrected as shown below:

Col 5., lines 35-40 the correct formula should read:

$$Z = \frac{Y^2/R}{1+(1-KA \cdot Y^2/R^2)^{1/2}} + \sum_{i=3}^{16} AiY^i$$

Signed and Sealed this

Twenty-sixth Day of June, 2007

JON W. DUDAS
*Director of the United States Patent and Trademark Office*